PARTY LINE TELEPHONE SYSTEMS

Filed Feb. 24, 1953 7 Sheets-Sheet 1.

Inventors
Norman Barrow
Beatrice Mary Robert
Harold George Edwards
By H. G. Hendry
Attorney Inventors
NORMAN BARROW
BEATRICE MARY ROBERT
HAROLD GEORGE EDWARDS
By H. S. Hendry
Attorney April 9, 1957 N. BARROW ET AL 2,788,394

PARTY LINE TELEPHONE SYSTEMS

Filed Feb. 24, 1953 7 Sheets-Sheet 3

Inventors
NORMAN BARROW
BEATRICE MARY ROBERT
HAROLD GEORGE EDWARDS
By
Attorney

April 9, 1957 N. BARROW ET AL 2,788,394

PARTY LINE TELEPHONE SYSTEMS

Filed Feb. 24, 1953 7 Sheets-Sheet 4

Inventors
NORMAN BARROW
BEATRICE MARY ROBERT
HAROLD GEORGE EDWARDS
By H. S. Hendry
Attorney Inventors
Norman Barrow
Beatrice Mary Robert
Harold George Edwards
By [signature]
Attorney Inventors
NORMAN BARROW
BEATRICE MARY ROBERT
HAROLD GEORGE EDWARDS
By H. G. Hendry
Attorney

PARTY LINE TELEPHONE SYSTEMS

Filed Feb. 24, 1953 7 Sheets-Sheet 7

Inventors
NORMAN BARROW
BEATRICE MARY ROBERT
HAROLD GEORGE EDWARDS
By H. G. Hendry
Attorney 2,788,394

PARTY LINE TELEPHONE SYSTEMS

Norman Barrow, Purley, Beatrice Mary Robert, London, and Harold George Edwards, Kidbrooke, London, England, assignors to Siemens Brothers & Co. Limited, London, England, a British company Application February 24, 1953, Serial No. 338,438

7 Claims. (Cl. 179—86)

Figure 1:
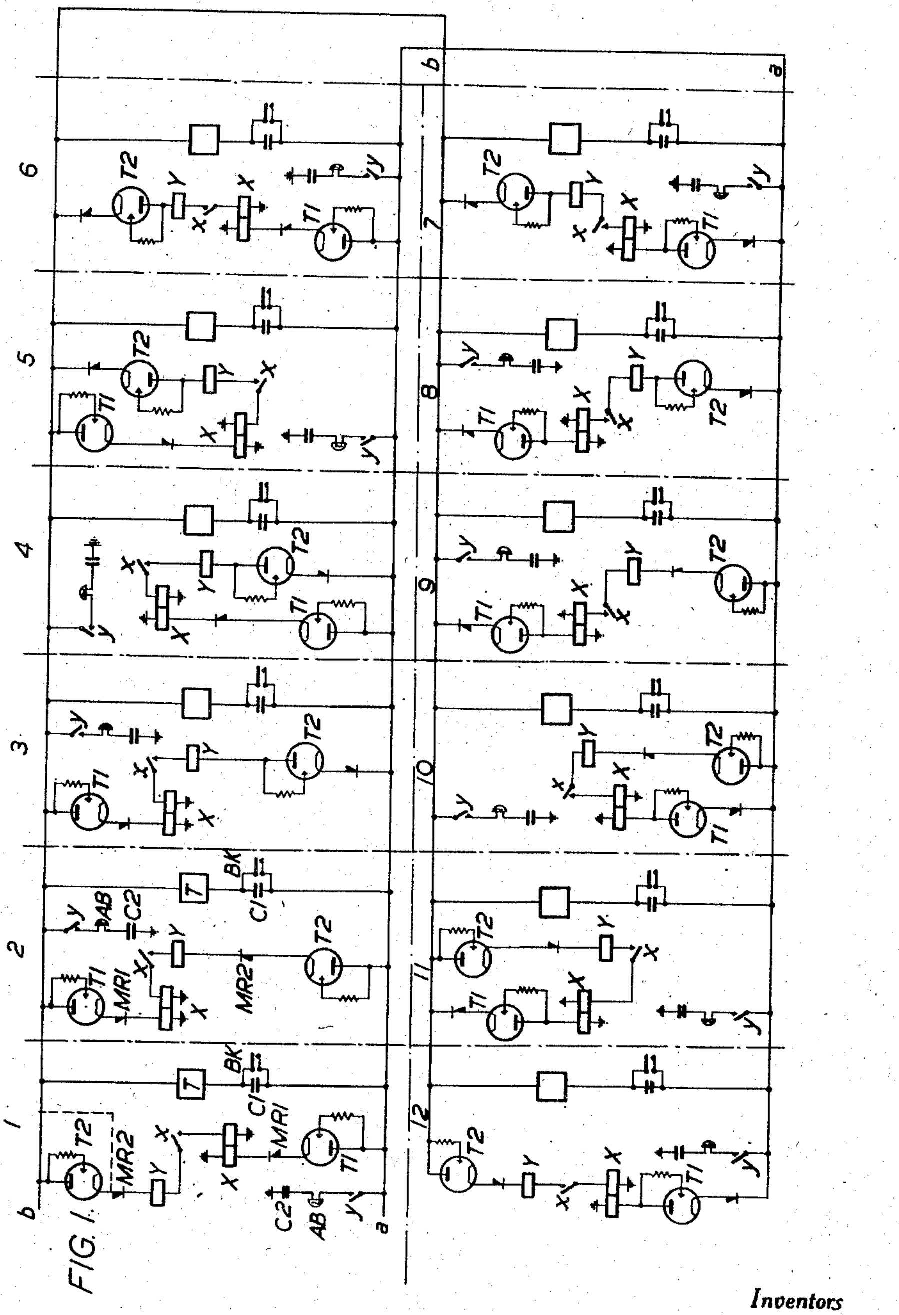

This invention relates to party line telephone systems and more particularly to selecting and calling arrangements in a system in which any party connected to a party line can be called without a signal being received by other parties on the same line.

In the present invention the bell of a party line subscriber is not normally connected to the line, switching means being provided at each subscriber's station on the line and selectively operated for connecting up the bell. The switching means is responsive to a code signal consisting of successive elements and the elements are characterised by the leg of the line over which they are transmitted and by an electrical characteristic such as polarity, the code differing for each subscriber's station and the selecting means at a subscriber's station responding only to the code characterising such station. The selecting means may take the form of an electromagnetic switching device, relays being especially suitable for the purpose. Each signal comprises at least two elements and at each station there will be a relay or equivalent device for operation by each element of the selecting signal, the operation of a relay on receipt of an earlier element preparing the circuit of the relay responsive to the succeeding element. Since it is not possible to cut off a code element immediately the code relay responsive to it has operated it is necessary to avoid using elements of the same characteristic successively. If leg ringing is employed, it is desirable that the relay responsive to the last element of the signal code should be connected to the opposite leg to that to which the bell that is to respond is connected. The earlier elements of a signal are in the form of short pulses but the last element of a signal persists until the call is answered in order to maintain the circuit for the bell. For preventing the release of a relay after the cessation of one element of a code signal until the succeeding element is received it may be arranged for the elements to overlap one another for a sufficient time but this can be done only when there is no possibility of confusion between the elements. One way of preventing such release is by transmitting successive elements over different legs of the circuit. As it is not possible to terminate the necessary overlap immediately the succeeeding relay has been operated care must be taken to ensure that a third code relay does not operate during the continuance of the first element should the first and third elements have the same characteristics. Another way of preventing premature release of a relay between successive signal elements is to arrange for the effect of the first element to continue until the second element is received. One example of this method is to provide the relays with delayed releasing characteristics. Another method is to reduce the signalling voltage to a value sufficient to hold the first element relay operated over one wire until the second element relay shall have operated over the other wire of the pair.

The invention permits the use of similar apparatus at each subscriber's station and the connection of further parties to the line without change of connections to existing parties. It enables ordinary alternating or pulsating ringing current and D. C. signalling current to be employed. Revertive calling in an automatic switching system may be carried out by the employment of simple means at a subscriber's station. No difficulty arises in the selection of any party from as many as twelve connected to a party line by the use of a code consisting of only two elements and without resort to other than alternating current ringing, and the only limitations to a larger number necessitating more than two code elements are those set by the resistance and leakance of the line and the maximum permissible voltage for signalling and ringing. In the system of the present invention a separate source of current has not to be provided at subscribers' stations.

The relays or equivalent devices are preferably not connected directly to the line wires but are connected thereto over gas discharge tubes preferably of the cold cathode type. In order to guard against improper operation of a relay due to non-rectifying properties of the gas discharge tubes, rectifiers, preferably of the dry plate type are connected in series with the relays and gas discharge tubes and of the relays connected to a wire for operation thereover in response to the first element of the code half of the number of relays connected to that wire will have rectifiers poled in one direction and half will have rectifiers poled in the other direction. Similar considerations apply to the rectifiers in the circuits of the relays or equivalent devices for operation in response to the second and any further element of the code. However, if it is always the case that the last element of the code will be transmitted over a different wire from the first element of the code the gas discharge tubes in the circuits of the relays responsive to the second element of the code may be omitted and the relays connected directly to the line wire in series with a rectifier. The gas discharge tubes may be of a kind operable by 130 volts applied to the line. The number of parties connected to a line may be doubled if biassed bells or bell circuits are used and unidirectional ringing current is employed, positive ringing current being used to ring one station and negative ringing current being used to ring the other station of an otherwise similarly connected pair of stations. To overcome or minimise any faulty operation that might follow from the counter E. M. F. set up by the rapid interruptions of the bell circuit the bell may be shunted by a resistance and a suitably poled rectifier connected in series.

The instrument circuit at each subscriber's station may include contacts conveniently operated by a pair of push buttons, one to close the contacts and other to open them, the contacts being shunted by a condenser to enable a subscriber to listen in order to ascertain if the line is free before calling, closure of the contacts looping the line when the receiver has been removed from its cradle. When a revertive call is made the caller will receive busy tone and then by opening the contacts he will remove the busy condition at the exchange or switching centre to enable the connecting switch to test in and seize the line, the caller reclosing the loop by operating the button to close the contacts when he hears the called subscriber's reply.

The party lines may be connected in the banks of special final selectors or apparatus including a code selecting switch may be associated with ordinary final selectors to which the party lines are connected for the purpose of receiving an additional digit or digits designating the wanted party on the called line and setting the code selecting switch to a position in which the relevant code elements will be applied to the line.

In another arrangement party lines may be connected at a group switching centre with junctions to a parent exchange, the group switching centre being provided with switching means for connecting a caller to a party line and a party line subscriber to the parent exchange and further means for selecting the code relevant to the wanted party on a party line. The group centre may also include an alarm checking circuit to which access may be had by an operator at the parent exchange and which will revert tones indicative of certain faulty conditions. The group centre may include a line finder-connector link circuit and relays for its control and further relays and a code selecting switch for the purpose of selecting and applying the code elements for selecting and ringing a particular subscriber connected to a party line. The arrangements contemplated provide for the testing of a party line after the code selecting digit or digits have been received and taken effect. They may also provide for earth to be connected to that line wire over which the first code element is not transmitted to guard against improper operation at a party line subscriber's station due to low line insulation and for a like reason earth may be connected to the wire over which the subscriber's bell is rung between successive applications of ringing current. Provision may also be made to prevent excessive current due to an earth fault on the line during code transmission.

Circuit arrangements embodying the invention will now be described by way of example with reference to the accompanying drawings.

Figure 2:
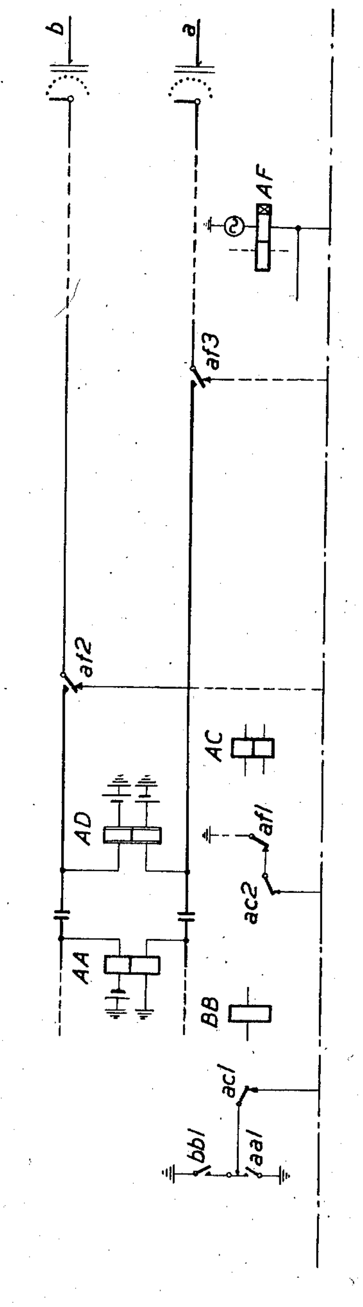
Figure 3:
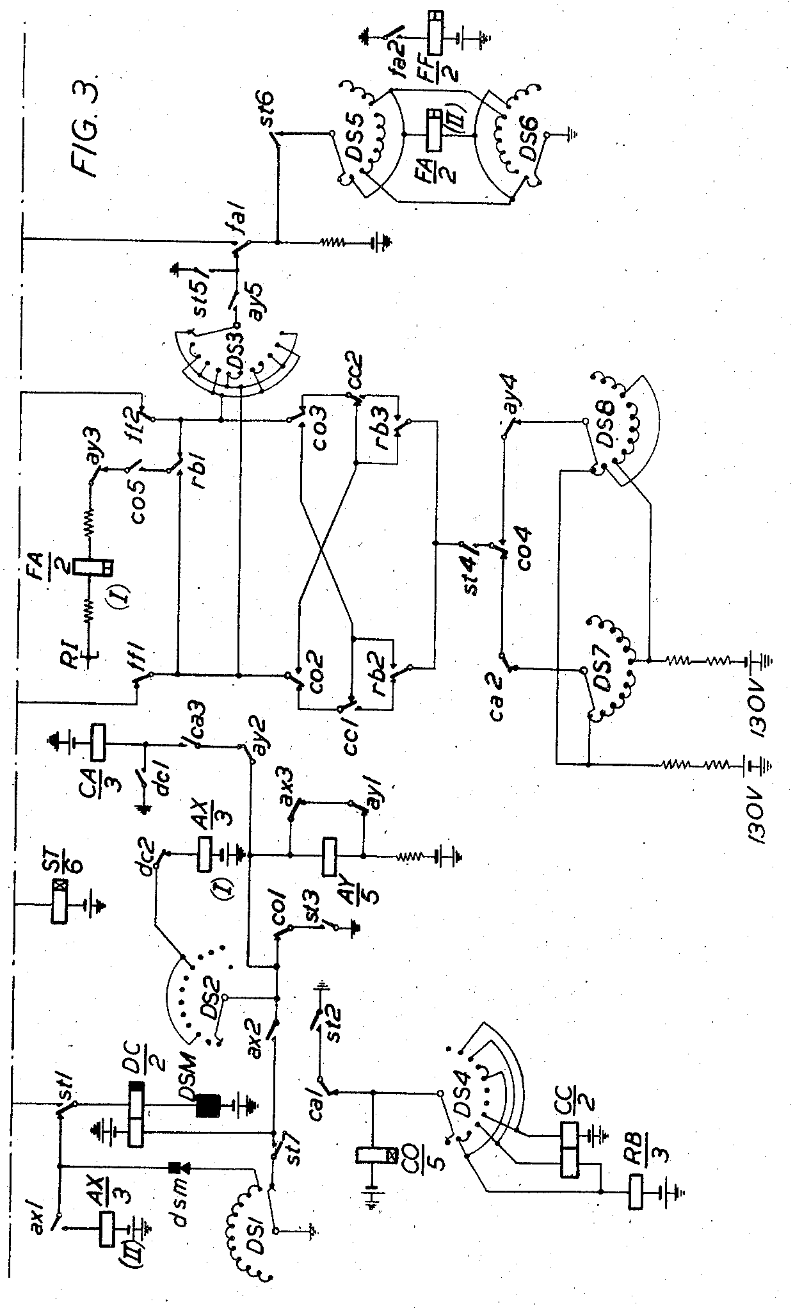

In the drawings Fig. 1 shows diagrammatically the connections of twelve subscribers' stations numbered 1 to 12 on a party line, Figs. 2 and 3 show a relay set for association with a final selector for the purpose of selecting and ringing any of the twelve subscribers on a party line connected as shown in Fig. 1, and Figs. 4 to 7 show the circuits at a group switching centre to which only party lines and junctions to a parent exchange are connected.

Reference will first be had to Fig. 1. In this figure it will be seen that each subscriber's station includes a telephone set indicated generally by the reference T, key BK, alternating current bell AB shown separate from the telephone set T, condensers C1 and C2, two gas discharge tubes T1 and T2, two dry plate rectifiers MR1 and MR2 and two relays X and Y. The gas discharge tubes, rectifiers and relays comprise the equipment for selecting the wanted party and the arrangement is such that relays X and Y at the wanted subscriber's station respond respectively to first and second elements of a code signal for connecting up the bell AB. The key BK is a diagrammatic representation of a switch that is operable by two push buttons, depression of one of the buttons closing the key contacts and depression of the other button opening them. The tubes T1 and T2 are of the cold cathode 3-electrode type and of a kind that will become conductive on the application of 130 volts to the line, and the rectifiers are inserted as a safeguard against improper operation of the relays which might occur, in their absence, when reversed current, with respect to the tube electrodes, flows. The bells AB are normally disconnected and a telephone instrument, when the receiver is removed from its rest is normally connected to the loop over a condenser so that no direct current flows over the line. When the instrument is used, the inclusion of the condenser in series with it permits the user to ascertain whether the line is in use or not without danger of interference to an existing conversation. To render the instrument effective for calling and speech the key BK must be depressed to short circuit the condenser. From an examination of the figure it will be seen that three of the tubes T1 and three of the tubes T2 are connected to the *a* wire for operation by the application of positive 130 volts at a parent exchange or switching centre to which the line is connected, and another two sets of three tubes are similarly connected to the *a* wire for operation by the application to that wire of negative 130 volts. The other 12 tubes are connected in a similar manner to the *b* wire. In particular, tubes T1 for operation by positive potential are connected to the *b* wire at stations 2, 3, 5 and to the *a* wire at stations 1, 4, 6 and for operation by negative potential to the *b* wire at stations 8, 9, 11 and to the *a* wire at stations 7, 10, 12. Tubes T2 for operation by positive potential are connected to the *b* wire at stations 1, 11, 12 and to the *a* wire at stations 2, 9, 10 and for operation by negative potential to the *b* wire at stations 5, 6, 7 and to the *a* wire at stations 3, 4, 8. The selecting code used has two characteristics, one, the polarity of the applied potential and the other the wire to which it is applied, two code elements being used for selecting a station. To call a station, the first element of the code causes three of the tubes T1 to strike and operate relays X in the three stations and to connect up relays Y and tubes T2 and the second element causes the tube T2 connected up at only one of the three stations selected by the first code element to strike and operate relay Y. For example positive on wire *b* will cause tubes T1 to strike at stations 2, 3 and 5 but not at any of the other stations as the tubes T1 thereat will either be connected to the *a* wire or will be connected to the *b* wire in a negative sense. Relay X at each of the three stations will operate and closure of contact *x* will connect earth over a second winding of relay X and relay Y to the circuit for tube T2. At station 2 tube T2 requires positive potential on the *a* wire to cause it to strike, at station 3 tube T2 requires negative potential on the *a* wire and at station 5 tube T2 requires negative potential on the *b* wire. It will thus be seen that a first code element selects three stations out of the twelve and the second code element selects one station out of the three selected by the first element. When a tube T2 strikes, relay Y is operated and relay X is held and contact *y* connects up the bell AB at the selected station to one of the line wires, in particular, to the line wire over which the second code element was not transmitted. The second code element is maintained during ringing. Ringing current is applied to the appropriate line wire to ring the bell in a leg circuit. In order to ensure a circuit for a tube T2 relay X must be maintained operated until the second code element is received. This is done in the present example by making the relay sufficiently slow to release to ensure that the relay remains operated during the interval between the termination of the first element and the application of the second element.

To answer a call the called subscriber lifts his receiver and operates the button to depress key BK to loop the line and trip the ringing, whereupon relays Y and X release and the bell is disconnected. To make a call, the caller lifts his receiver and listens to ascertain if the line is in use and if it is free he operates the button to depress key BK and then dials the designation of the wanted subscriber. So far as line selection is concerned this consists of the digit or digits for selecting the line followed by one or two digits for selecting the code appropriate to the subscriber on the selected line. The caller will receive ringing tone if the line is free or busy tone if the line is busy in the normal manner. In the case of a revertive call he will, of course, receive busy tone and knowing that it is a revertive call he then presses the button to restore key BK to open the loop. When the called subscriber answers the call his voice will be heard by the caller who will then again press the button to close the contacts of key BK to loop the line. Exemplary circuits showing the effect of these operations and for the setting up of calls to and from a party line subscriber will be fully described later in connection with Figs. 4–7.

Tubes T2 are shown connected at all the twelve stations on the party line so that the equipment at each station is the same thereby enabling any equipment to be installed at any station. For the purpose of operation of the system, tubes T2 at stations called by a code the two elements of which are applied to different line wires may be omitted, the circuit for reception of the second element of the code then including the dotted line connection shown at station 1. If the number of parties on a line is restricted to 8 the stations 4, 5, 10 and 11 would be omitted thereby avoiding any necessity for providing tubes T2.

The relay set illustrated in Figs. 2 and 3 shows how equipment may be associated with a final selector to deal with calls to the 12-party line of Fig. 1. Fig. 3 should be placed beneath Fig. 2. Above the dotted line is shown so much of a final selector as is thought necessary for the understanding of the invention, the associated relay set being shown beneath the dotted line. The relay set comprises nine relays and a 12-outlet stepping switch with eight wipers and banks DS1–DS8 and stepping magnet DSM. It is adapted to be set by two digits the first of which is 2 or 8. It is to be understood that in the present example the final selector is of the 200 outlet type with wiper switching and that the party lines are connected in the part of the bank the wipers of which are connected up when the wiper switching relay is operated. The final selector has impulse receiving relay AA and answering supervisory relay AD over which relays current is fed to the calling and called parties respectively. There is the usual release control relay BB, dialling relay AC and ring tripping relay AF. Other relays necessary for the control of the final selector and which play no part in the selection of a particular party on a party line are not shown; and their provision is to be taken as understood. It will be understood that relay AC acts as a dialling relay and is operated before the receipt of the tens and units impulse trains for the setting of the final selector to the bank contacts connected to the wanted line and is released after the termination of each of these impulse trains and thereafter remains unoperated so long as the final selector is in use. After the end of the tens impulse train a slow operating relay is operated in the usual manner and the operation of this relay bring about the operation of relay AC. It also brings about the operation of the wiper switching relay a make contact of which is included in the circuit for relay ST. The wiper switching relay when operated will be arranged to disconnect the ringing circuit in the final selector and extend the ringing leads to the relay set, this latter connection being over the dotted lines from contacts *af*2 and *af*3. It will thus be understood that when the final selector is taken into use for a call to a party line subscriber the wiper switching relay will be operated following termination of the tens train of line selecting impulses and operation of relay AC will also take place. On the termination of the units train of impulses relay AC will release and a circuit will then be closed over contacts *af*1 and *ac*2 for relay ST which is slow to operate in order to cover any lag between operation of the wiper switching relay and relay AC. Contact *st*1 prepares a circuit over contact *bb*1 of the final selector release control relay and contact *ac*1 for slow releasing relay DC in series with stepping magnet DSM. Contact *st*2 closes a circuit for slow operating relay CO but this is almost immediately opened by contact *ca*1 on the operation of relay CA, contact *st*3 closes a further circuit for relay CA over contacts *co*1, *ay*2 and *ca*3, contact *st*4 prepares for the application to the line of the first element of the party selecting code, contact *st*5 prepares a circuit for earthing the wire over which the first code element is not transmitted and in conjunction with contact *st*6 short circuits winding (II) of ring tripping relay FA and contact *st*7 connects earth over wiper DS1 to the left hand winding of relay DC to operate it. Contact *dc*1 closes an operating circuit for relay CA and contact *dc*2 disconnects a possible circuit for winding (I) of relay AX. Operation of relay CA besides preventing operation at this time of relay CO disconnects wiper DS7 of the stepping switch at contact *ca*2. When the first of the party selecting impulse trains is received relay AA responds and at contact *aa*1 closes the circuit for magnet DSM which operates in series with the right hand winding of relay DC. At the end of the impulse break, relay AA reoperates and releases magnet DSM which thereupon advances the wipers one step. Similar operations take place for each successive impulse in the party line selecting impulse trains. Relay DC holds during impulsing by reason of its copper slug. The first impulse train in the present example will consist of either 2 or 8 impulses and at the end of the train relay DC will release and at contact *dc*2 will connect earth over contacts *st*3, *co*1 and wiper DS2 to winding (I) of relay AX. Relay AX operates and locks up over its winding (II), contact *ax*1, interrupter contacts *dsm* of magnet DSM, wiper DS1 off normal to earth, and at contact *ax*2 closes a circuit for re-operating relay DC over contacts *st*3 and *co*1, and at contact *ax*3 opens a short circuit about relay AY. Relay DC re-operates and holds relay CA during receipt of the second train of impulses and relay AY operates, opens a further point in the short circuit about its winding at contact *ay*1, opens the alternative holding circuit for relay CA at contact *ay*2, opens a point in the ringing circuit at contact *ay*3, disconnects wiper DS8 at contact *ay*4 and connects earth over contact *st*5 to wiper DS3 at contact *ay*5. The second impulse train which in the present example will consist of from 1 to 6 impulses will now be received and repeated to magnet DSM and the switch wipers will be advanced to a position indicative of the wanted party on the selected party line. At the end of this impulse train relay DC will release as relay AX will have been released at contacts *dsm* during the first impulse break period of the second impulse train so that contact *ax*2 will now be open. Relay CA is released at contact *dc*1 and closes the circuit for relay CO at contact *ca*1 and also extends earth to wiper DS4, at contact *ca*2 connects up wiper DS7 and at contact *ca*3 opens its alternative holding circuit against the release of relay AY. When relay CO operates, contact *co*1 disconnects earth from relay AY to bring about its release, contacts *co*2, *co*3 and *co*4 change over in the code transmitting circuit and contact *co*5 closes in the ringing circuit. During the operating period of relay CO the first code element is applied to the line. Examination of the connections to the contact bank of wiper DS4 will show that relay RB is operated alone in positions, 2, 3, 8 and 9 and in series with relay CC in positions 4 and 10 and that relay CC is operated alone in positions 5 and 11. These two relays determine the wires to which the party selecting code elements are to be applied, relay RB operating alone for a first element over wire *b* and the second element over wire *a* and with relay CC for first and second elements over wire *a* and relay CC operating alone for first and second elements over wire *b*. With neither of these relays operated the first element of the code will be over wire *a* and the second element over wire *b*. For the sake of example it will be assumed that the designation of the wanted party is 86. The stepping switch will have been set to position 3 in which relay RB is operated. Contact *rb*2 connects positive 130 volts over bank and wiper DS7, contacts *ca*2, *co*4, *st*4, *rb*2, *cc*1, *co*2, *ff*1, *af*2 to wire *b*. At the same time earth over contacts *st*5 and *ay*5, wiper DS3, contacts *ff*2 and *af*3 is applied to wire *a*. Shortly afterwards relay CO operates and at contact *co*1 releases relay AY and at contact *co*4 disconnects wiper DS7 and prepares a connection over wiper DS8. On the release of relay AY the earth on wire *a* is disconnected at contact *ay*5 and the second element of the code is transmitted by negative 130 volts applied over bank and wiper DS8, contacts *ay4*, *co4*, *st4*, *rb2*, *co3*, *ff2* and *af3* to wire *a* to connect up the bell of the wanted subscriber, and ringing current is applied over wire RI, high speed relay FA, contacts *ay3*, *co5*, *rb1*, *ff1* and *af2* to wire *b* to ring the bell in a leg circuit. In this example the number 86 dialled by the caller represents station 3 in Fig. 1, it being noted that the station numbers in Fig. 1 correspond to the contact positions in the bank of the code uniselector. When the called subscriber answers, relay FA operates and at contact *fa2* operates high speed relay FF which at contacts *ff1* and *ff2* cuts off the ringing current and disconnects the party selecting code circuit from the line wires. Contact *fa1* operates slow operating relay AF, which also serves as the ringing tripping relay for calls to individual lines, the contacts *af2* and *af3* switch the line wires through. Relay AF locks up over its left hand winding in a local circuit. Contact *af1* releases relay ST which releases relay CO at contact *st2*, and opens the code transmitting circuit at contact *st4* and the circuit for magnet DSM at contact *st1*, and at the latter contact closes a homing circuit for the stepping switch over contacts *dsm* and wiper DS1 and the stepping switch is homed, the circuit being opened in position 1 of wiper DS1. During ringing, winding (II) of relay FA is short circuited from earth over contacts *st5*, *fa1*, *st6* and wiper DS5 and earth over wiper DS6. When relay FA has operated by means of its winding (I) contact *fa1* removes this short circuit and winding (II) of the relay is energised, in one direction over contacts 1, 2, 9–12 of the banks of wipers DS5 and DS6 and in the other direction over contacts 3–8 of these banks. These groups of contact positions correspond respectively to positive and negative potentials for the second code element and the arrangement is to ensure that relay FA is held after the called loop has been closed whichever the direction of current flow over the loop. Following on the operation of relay AF, answering supervisory relay AD operates with the usual results. When the connection is ultimately released relay AA releases followed by relays BB, AD and AF.

For the purpose of dealing with revertive calls a group of contacts in a group selector may be set aside for the purpose and connected to relay sets which will provide for the transmission of the code elements in a similar manner to the relay set shown in Figs. 2 and 3. The group selector would be set in response to a special digit indicative of a revertive call and this digit would be followed by two code-selecting digits for the operation of the relay set in a similar manner to that illustrated. When the line is tested busy tone will be reverted and the caller, by pressing the button to open the loop across the line will thereby enable code transmission and ringing to proceed. When the wanted subscriber answers the caller will press the button to re-close the loop so that conversation may proceed.

Figure 4:
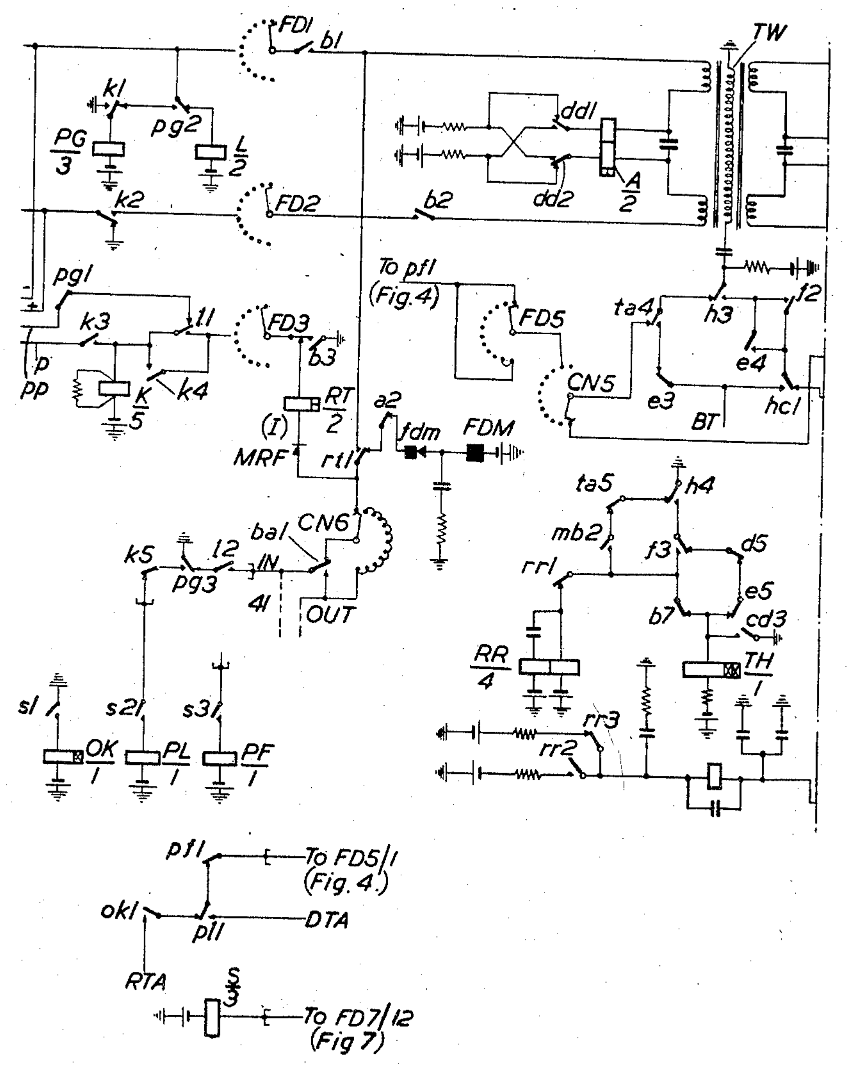
Figure 5:
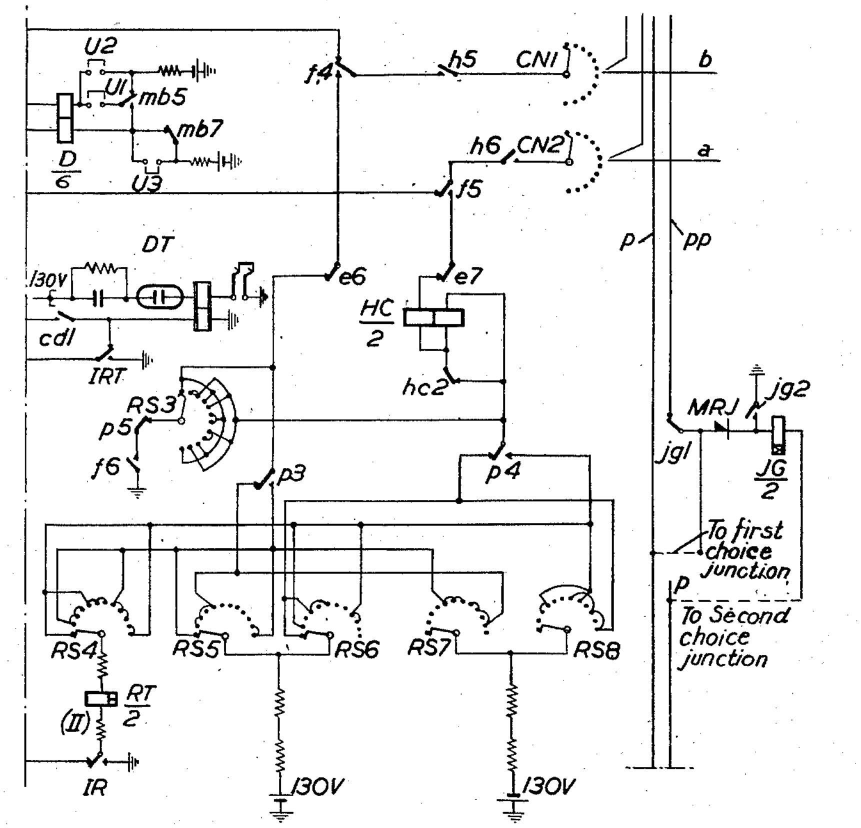
Figure 6:
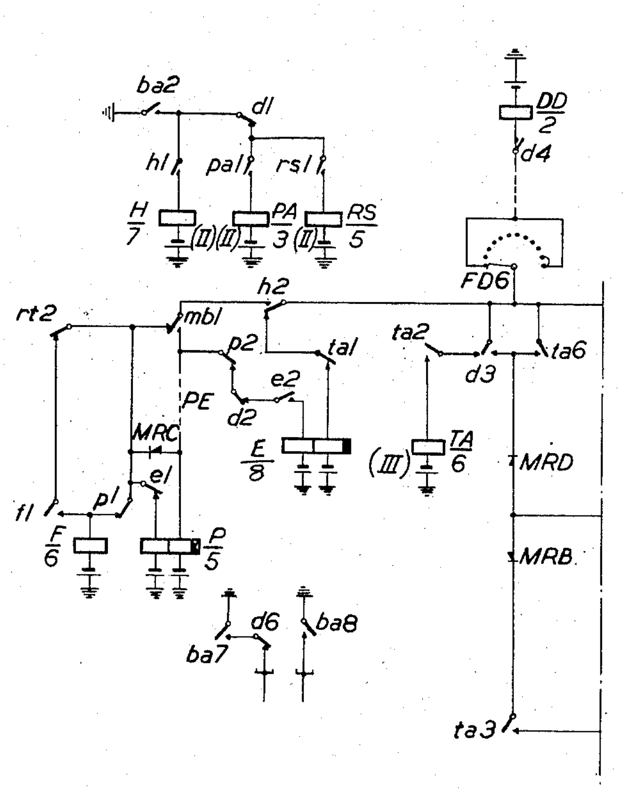
Figure 7:
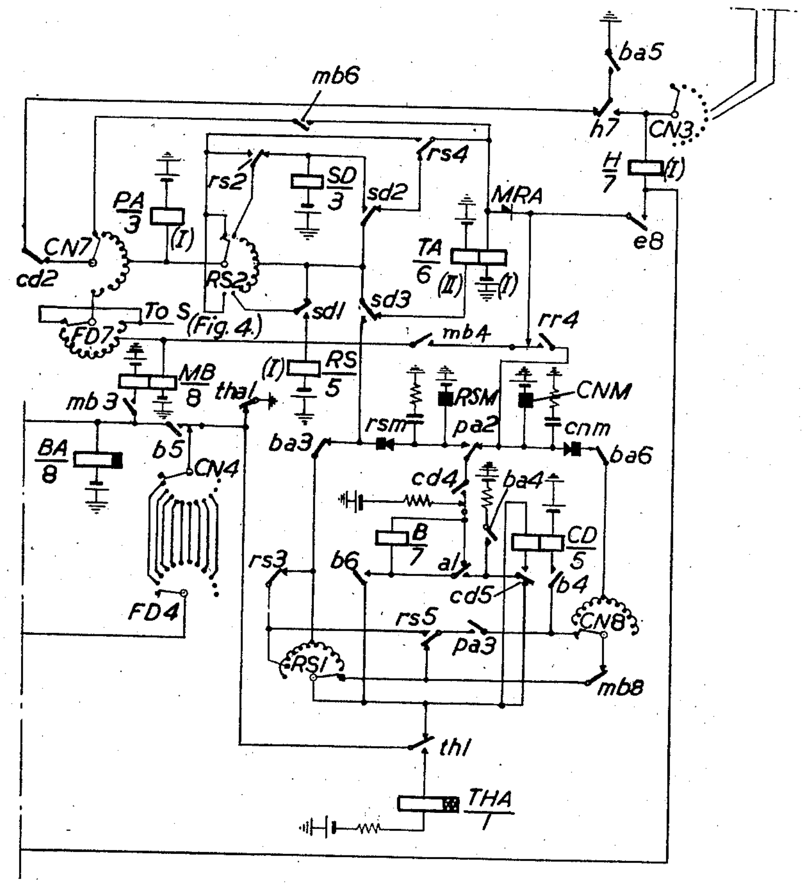

Reference will now be had to Figs. 4–7 which should be arranged with Fig. 5 to the right of Fig. 4 and Figs. 6 and 7 beneath Figs. 4 and 5. These show circuits at an automatic group switching centre serving a small number of multi-party lines. The actual arrangements shown cater for nine party lines, to each of which up to twelve subscribers may be connected, and three junction lines to a parent exchange. The subscribers' stations on a party line would be connected as shown in Fig. 1. The arrangements include four line finder-connector links, the line finders and connectors each being twelve point pawl and ratchet driven uniselectors of the reverse drive type. Each link includes a feeding bridge of the repeating coil type with split windings and a tertiary winding TW for inducing tones into the line wires. In addition to the two uniselectors referred to there is a similar uniselector for the application of the code elements and ringing current. This uniselector has 8 wipers and associated contact banks designated RS1–RS8 and stepping magnet RSM with self-stepping contacts *rsm*. The line finder has 7 wipers and banks designated FD1–FD7 and stepping magnet FDM with self-stepping contacts *fdm* and the connector has 8 wipers and banks designated CN1–CN8 and stepping manget CNM with self-stepping contacts *cnm*. These uniselectors may be assumed to be of the type described in United Kingdom specification No. 616,-692 dated September 2, 1946. For the purpose of selecting a required party on a party line positive and negative potentials of 130 volts are used over one or other of the line wires, the battery leads being connected up only while a link circuit is in use. The feeding bridge uses a 100 volt battery with mid-point earth and the relays and uniselectors are connected to a supply at 50 volts, this supply being a battery with the positive pole earthed. It is to be understood that although batteries are referred to the several potentials concerned may be obtained by rectifying alternating current from supply mains or by D. C. vibrators in known manner. For the purpose of switch contact identification the contacts will be referred to by number in the order of traverse by the wipers commencing at 1 and ending at 12. In the arrangements shown the three junctions to the parent exchange are connected to contacts 1, 11 and 12 in the banks of the line finder and connector. There will be a busy tone generating circuit (not shown) common to the exchange and an alarm checking circuit, likewise common to the exchange. The connector is set in response to a single digit, and the selection of the wanted party on a party line is effected in response to one or two further digits, single digit selection being used for 9 of the parties on a line and two digit selection being used for the other three parties on the line. For line selection the single digit 0 is used for junction calls and one of the digits 1 to 9 is used for the selection of a party line. Revertive calls are made without use of a junction to the parent exchange. Throw out arrangements are provided to meet certain abnormal conditions.

A detailed description will now be given of the circuits illustrated and their operation for different kinds of calls. The four link circuits are connected to a chain, each link circuit being the first choice for three incoming lines, a parent exchange junction being included in three of the four groups of incoming lines. The chain is endless, the out wire of the first link circuit being connected to the in wire of the second and so on, the out wire of the fourth link circuit being connected to the in wire of the first as indicated by the dotted line 41. Each incoming line terminates in a line circuit which includes the line relay L, permanent loop relay PG and cut-off relay K and is connected to contacts in the banks of wipers FD1, FD2 and FD3 of the line finders. Terminals *p* and *pp* are strapped except in the line circuit of the first choice of three junctions. The chain circuit includes wiper CN6 of the connector and the line finder test relay is a high speed relay designated RT. When a call is initiated the caller lifts his receiver to ascertain that his line is not in use and then presses a button to loop the line whereupon relay L operates over the loop and at contact *l1* connects battery over relay K and the shunting resistance to the relevant contact in the banks of wipers FD3 and at contact *l2* connects earth over contact *pg3* to the chain circuit. Assuming that the link circuit illustrated is the first choice of the calling line and is free, earth on the chain circuit will extend over contact *ba1*, wiper CN6 in position 1, back contact *rt1*, contacts *a2* and *fdm*, magnet FDM to battery. The magnet operates and by means of its contacts *fdm* steps the wipers in search of the calling line. When contacts to which this line is connected are reached relay RT operates in a circuit from earth on the chain circuit over contact *ba1*, wiper CN6, rectifier MRF, winding (I) of relay RT, back contact *b*3, wiper FD3, contact *l*1, resistance shunting relay K to battery. Contact *rt*1 changing over opens the magnet stepping circuit preventing re-energisation of magnet FDM and extends the earth on the chain circuit to the winding of feed relay A that is connected over back contact *dd*1 to the negative pole of the 100 volt feed battery. If the link circuit illustrated is engaged at the time a call originates in a group of lines for which it is the first choice, contact *ba*1 will be in its operated condition as will subsequently appear and the earth on the chain circuit will be over front contact *ba*1 or over back conatct *ba*1 and wiper CN6 and the commoned contacts in the bank as the case may be to the in wire of the next link on the chain and if that link is free the line finder stepping magnet in that link will be operated and the associated line finder will be stepped in search of the calling line. Returning now to the finding of the calling line by the line finder of the link circuit illustrated and the operation of relay RT, it will be seen that relay K is connected in series with relay RT and will operate. Contact *k*1 connects earth to relay PG to operate it, contact *k*2 disconnects earth from the positive line wire and connects this wire through to the bank of wiper FD2, contact *k*3 extends the earth on wiper FD3 over contact *l*1 to the test wire in the connector multiple, contact *k*4 shunts contact *l*1 against the eventual release of relay L and contact *k*5 opens a circuit for alarm checking purposes to be referred to later. Consequent on the operation of contact *k*2, relay L releases and disconnects earth from the chain circuit. In the link circuit, following the operation of relay A over its upper winding, contact *a*1 closes the following circuit for the release relay B; earth over contacts *tha*1, *th*1, *cd*5, *a*1, relay B, contact *cd*4, resistance to battery. Relay B operates and at contact *b*6 closes a holding circuit for itself independent of contact *cd*5. Contact *b*1 extends the positive line wire over wiper FD1 to the upper winding of relay A, contact *b*2 extends the negative line wire over wiper FD2 to the lower winding of relay A which is connected over back contact *dd*2 to the negative pole of the 100 volt feed battery, contact *b*3 connects earth directly to wiper FD3 to hold relay K and release relay RT, and contact *b*4 connects relay CD to earth in the following circuit; earth over contacts *tha*1, *th*1, wiper RS1 in position 1, contact *mb*8, wiper CN8 in position 1, contact *b*4 right hand winding of relay CD to battery. Contact *b*5 connects earth over contact *tha*1 to slow releasing relay BA, and over contacts *tha*1, *b*5, *h*2 and *ta*1 to the right hand winding of relay E. Relay CD operates and at contact *cd*1 connects a source of dialling tone DT individual to the link circuit over first bank contact and wiper CN5, contacts *ta*4, and *h*3 to the tertiary winding TW on the repeating coil, at contact *cd*3 connects earth temporarily to the thermal relay TH which has a long operating time lag and will not operate during the continuance of an impulse train, at contact *cd*4 prepares the circuit for impulsing magnet CNM and at contact *cd*5 prepares a connection for holding relay CD during impulsing after the connector has been stepped from its first contacts. Relay E operates and at contacts *e*6 and *e*7 disconnects the code circuit from the leads to the line wipers of the connector, at contact *e*8 prepares a test circuit for the connector test relay H and at other contacts performs mainly guarding functions. Following on the operation of relay B, relay BA operates and performs the following functions: extends the chain circuit to the next link circuit at contact *ba*1, opens a point in the homing circuit for magnet RSM at contact *ba*3, prepares a holding circuit for relay CD at contact *ba*4, connects up earth for several relays at contact *ba*5 but the relay circuits are open at this time at contact *cd*2, opens a point in the homing circuit for magnet CNM at contact *ba*6, connects earth to the tone start circuit at contact *ba*7 and connects earth to a wire to apparatus for connecting up the 130 volt battery at contact *ba*8. The link circuit is now ready to receive impulses.

If a call is to be extended to a party line subscriber from 1 to 9 impulses will be received according to the line on which the wanted subscriber is connected. These impulses are received by relay A and repeated at contact *a*1 to magnet CNM in the following circuit; earth over contacts *tha*1, *th*1, *b*6, *a*1, *cd*4, *pa*2, magnet CNM to battery and the magnet operates and advances the wipers of the connector one step each time it is released on the re-operation of relay A. Whilst relay A is operated relay B is short circuited and holds up during the break period of the received impulse and relay CD is held operated by means of its left hand winding from the earth over contacts *th*1, to battery over contacts *cd*5 and *ba*4 and the resistance. When the connector makes its first step the circuit for the right hand winding of relay CD is opened at wiper CN8 and the relay is held during the make period of the received impulses by reason of the short circuit across its left hand winding over contacts *b*6, *a*1 and *cd*5, the relay releasing on the prolonged operation of relay A at the end of the impulse train. Wipers CN1, CN2, and CN3 are set by the impulse train to contacts connected to the called line, wiper CN5 disconnects dialling tone, wiper CN6 disconnects the chain circuit for the link in use and in parallel with contact *ba*1 extends it to the next link on the chain and wiper CN7 prepares a circuit for operating relay PA over its winding (I). At the end of the impulse train relay CD releases, contact *cd*1 opens a further point in the dialling tone circuit, contact *cd*2 closes a circuit from earth over contacts *ba*5, *h*7 and wiper CN7 for winding (I) of relay PA, contact *cd*3 disconnects earth from the thermal relay TH and contact *cd*4 opens the impulsing circuit for magnet CNM. Relay PA operates and locks up by means of its winding (II) over contacts *pa*1, *d*1 and *ba*2 and at contact *pa*2 switches the impulse repeating circuit from magnet CNM to magnet RSM and at contact *pa*3 re-operates relay CD over its right hand winding and first contact in the bank of wiper RS1. Relay CD re-operates with the before mentioned results except that at contact *cd*4 the impulse repeating circuit is prepared to extend to magnet RSM instead of to magnet CNM. A second train or second and third trains of impulses denoting the particular subscriber on the party line is or are now received and the digit or digits determine(s) the ringing code to be used. The impulses of the second train are repeated by relay A over front contact *pa*2 to magnet RSM and this uniselector is stepped accordingly. If the second train consists of a single impulse relay SD will be operated in a circuit over wipers CN7, RS2 bank contact 2 and contact *rs*2 after relay CD has released. Contact *sd*1 prepares a circuit for relay RS, and contacts *sd*2 and *sd*3 extend earth over wiper RS2 to magnet RSM. The magnet re-operates, first over contact *rs*2 and contact 2 in the bank of wiper RS2 to step the uniselector to contact 3 by self-interruption at contacts *rsm* and thereafter over commoned contacts 3 to 10 to step the wipers to contact 11. When bank contact 11 is reached by wiper RS2 relay RS operates by means of its winding (I) connected to the bank contact, and magnet RSM remains de-energized, its self-stepping circuit being opened at wiper RS2. Relay SD which remained operated in parallel with magnet RSM releases but before it does so relay RS locks over its winding (II), contacts *rs*1, *d*1 and *ba*2. Contact *rs*5 extends earth over contacts *tha*1, *th*1, wiper RS1, contacts *pa*3 and *b*4 to relay CD to re-operate it. The digit 1 is the tens digit for a party line subscriber selected by dialling 11, 12 or 13 as the party selecting digits. The units digit is repeated by relay A to magnet RSM and according to the value of the digit the uniselector is stepped to contact 12, 1 or 2. At the end of the impulse train, when relay CD releases, relay TA is operated by means of its winding (I) over wiper RS2 and contact *rs4*, and, if the switch is in position 2, over contact *rs2*. Contact *ta1* opens to initiate the release of relay E contact *ta2* connects earth over contacts *tha1*, *b5* and *d3* to winding (III) of relay TA to hold it, contact *ta3* plays no part unless the call is a revertive call and contact *ta4* prepares for the transmission of busy tone. If a single party-selecting digit is dialled by the caller the impulse train will consist of from 2 to 10 impulses and the code uniselector will be set to one of the positions 3 to 11 and relay RS will not be operated and relay TA will operate over its windings (I) and (II) in parallel when relay CD releases after the end of the impulse train, relay SD being unoperated. If the line is free relay H operates during the release period of relay E from the earth that operated relay TA, over rectifier MRA and contact *e8* and locks up over its winding (II), contacts *h1* and *ba2* and at contact *h2* closes a circuit over contacts *mb1* and *p1* for relay F and after the release of relay E extends earth over contacts *mb1* and *e1* for slow operating relay P. Contact *h3* disconnects the prepared busy tone circuit and prepares a ringing tone circuit, contact *h4* prepares a circuit for the ringing generator relay RR, contacts *h5* and *h6* connect up wipers CN1 and CN2 in the line wires and contact *h7* connects earth directly to wiper CN3 to busy the called line and disconnects winding (I) and (II) of relay TA. When relay F operates and relay E has released, the former relay locks up over contacts *f1* and *rt2* to the earth over contacts *b5* and *tha1*, at contact *f2* connects up the ringing tone source over contacts *hc1* and *h3* to winding TW on the repeating coil, at contact *f3* closes a circuit over contacts *h4* and *rr1* for the ringing current generator RR, at contacts *f4* and *f5* disconnects the feeding bridge circuit from the connector line wire wipers and connects the latter over contacts *e6* and *e7* and back contacts *p3* and *p4* to contacts in the banks of wipers RS5—RS8 and contact *f6* connects earth over contact *p5* and wiper RS3 to the junction of contacts *p3* and *e6* or *p4* and *e7* according to the position of wiper RS3, to maintain earth on that wire to which the first code element is not applied. Following the closure of contact *f3* relay RR operates in known manner as an impulse generator, interrupting its own circuit at contact *rr1*. Contacts *rr2* and *rr3* connect negative and positive battery alternately to wiper RS4, the bank contacts of which are not connected up at this time, for the ultimate ringing of the called subscriber's bell. According to the position of wipers RS5—RS8 positive or negative 130 volts potential is applied to either the *a* or *b* wire of the selected party line. After application of this potential relay P will operate and at contact *p1* open the operating circuit for relay F leaving that relay dependent on relay RT for its continued operation. Contacts *p3* and *p4* change over in the connections of the uniselector code wipers RS5—RS8 to the line wires and contact *p5* disconnects earth over contact *f6* and wiper RS3 from the relevant line wire. The second of the two code elements is now applied to the line wires and the ringing battery is connected up to that one of the line wires to which 130 volts is not applied to ring the bell of the selected party, the second code element continuing until the call is answered or the connection abandoned. As in the case of Figs. 2 and 3 the contact positions in the banks of the code uniselector correspond to the numbers of the station in Fig. 1. During the transmission of the first code element it will be noted that earth over wiper RS3 is applied to the *b* wire in positions 1, 4, 6, 7, 10 and 12, and to the *a* wire in positions 2, 3, 5, 8, 9 and 11. This is done to prevent false striking of the gas discharge tubes in the subscribers' stations that might occur under low insulation conditions. It will also be noticed that following the operation of relay P the second signal is applied to one line wire and the ringing battery to the other line wire of the pair. Ringing is interrupted at contacts IR in known manner, the line wire to which ringing battery is connected being earthed between successive pulses of ringing current. Ringing tone is transmitted from DT over contacts IRT, *hc1*, *f2*, *h3* and winding TW. Relay HC has a low resistance winding in the connection to the *a* wire of the line and a high resistance winding short circuited over contact *hc2*. The function of this relay is to prevent excessive current flow should the line be of low resistance to earth and will be referred to later. When the wanted subscriber replies and loops the line, relay RT operates by means of its winding (II) during a period when battery is connected and at contact *rt2* releases relay F which cuts off the code and ringing circuits at contacts *f4* and *f5* and extends the called party line back to the feeding bridge in which circuit relay D operates. Contact *f2* disconnects the ringing tone circuit from the repeating coil. Contact *d1* releases relays PA and RS, contact *d3* releases relay TA, contact *d5* opens to guard relay TH against operation following release of relay F and contact *d6* opens in the tone start circuit. The circuit is now in the conversational condition. If, instead of the line being found free when tested it is found engaged relay H will not operate and on the release of relay E, relay P will not be operated and contact *e3* will connect the busy tone wire BT over contacts *ta4* and *h3* to the repeating coil and the caller will hear the tone. Relay RR will not be operated.

If the caller should dial an unused two digit party line code, that is, one of the numbers 14–19 and 10, the code uniselector will be set to one of the positions 3 to 9 with relay RS operated. Relay TA will be operated by its winding (II) when relay CD releases but earth will not be connected to rectifier MRA so that no test will be made by relay H. When relay E releases busy tone will be reverted over contacts *e3* and *ta4* as previously described for a busy line.

At the end of the conversation, when the connection is cleared by the caller replacing his receiver relay A releases, releasing relay B by short circuit over contact *a1*. Contacts *b1* and *b2* disconnect the line wipers of the line finder from the feeding bridge, contact *b3* disconnects earth from wiper FD3 thereby releasing relay K and contact *b5* releases relays BA and P. Contact *ba1* closes in the connection of the link circuit illustrated to the chain circuit, contact *ba2* releases relay H, contact *ba3* closes a homing circuit for the code uniselector, contact *ba5* disconnects earth from the connector test wiper CN3 to release the called line cut-off relay, contact *ba6* prepares the homing circuit of the connector and contacts *ba7* and *ba8* open in the tone and 130 volt battery control circuits. Magnet RSM operates in a circuit from earth over contacts *tha1*, *th1*, wiper RS1, contacts *ba3*, *rsm*, magnet RSM to battery, contact *rs3* being included in the circuit over contact 11 in the bank of wiper RS1, and the uniselector is driven to its first position in which the circuit for magnet RSM is opened at wiper RS1. Magnet CNM now operates from the same earth over wiper RS1 in position 1, contact *mb8*, wiper CN8, contacts *ba6* and *cnm*, magnet CNM to battery and the connector is driven to its first position in which the circuit of magnet CNM is opened at wiper CN8. The line finder remains in the position in which it was used. Release of relay K releases relay PG.

If a revertive call is made the connector will be set to contacts connected to the same line as those of the line finder. Contacts corresponding to the same line in the banks of wipers FD4 and CN4 of the line finder and connector respectively are connected together. The connector is set in the manner previously described but relay TA will be held by its winding (III) from earth over contacts *tha1*, *b5* wipers CN4 and FD4, rectifier MRD, contacts *ta6*, *d3* and *ta2*. As the wanted line will test engaged relay H will not operate and the code will not be transmitted as relay F will not have been operated. The caller will hear busy tone over wire BT, contacts *e3*, *ta4*, h3 and the repeating coil, and, knowing that it is a revertive call will press the button in his instrument set to open the loop but will not replace his receiver. Relays A and B will release and contact b3 will disconnect earth from the line finder test wire wiper FD3. Before relays K and BA release, earth over contacts tha1, b5, wipers CN4 and FD4, rectifier MRB and contact ta3 will be connected to relay H and that relay will operate in series with relay K and operate relay F over contact h2. Code transmission and ringing follows as previously described and when the called subscriber replies relay RT operates and releases relay F which connects relay D to the line. Relay D operates and releases relay TA. During ringing, the caller will hear ringing tone as in the case of a non-revertive call. When the called subscriber answers the call the caller will press the button to reclose the loop. Current will be fed to the line over relay D.

Should the called party in a revertive call fail to answer, the connection will be forcibly released after a predetermined interval. This interval is determined by the operating lag of two thermal relays TH and THA. During the interval a circuit for relay TH will exist from earth over contacts h4, f3 and b7. Relay TH on operating disconnects earth from relay B at contact th1 and closes a circuit for thermal relay THA. After a further period relay THA operates and at contact tha1 releases relays BA, TA, F and P, the circuits for these relays being over wipers CN4 and FD4. The circuit of relay THA is also opened. Release of relay BA releases relay H at contact ba2 and prepares the homing circuits for the connector and code uniselector. The caller should have cleared by the time relay THA operates and when that relay and relay TH have cooled to allow their contacts to assume their normal positions the connector and code uniselector will be homed.

To make a call to the parent exchange a party line subscriber will dial "0" to direct the connector to the first choice of three junctions to the parent exchange. This junction is connected to contacts 11 in the connector banks and the second and third choice junctions are connected respectively to contacts 12 and 1. In the bank of wiper CN3 the test wire from contact 11 is connected to terminal p in the line circuit and in the case of the first choice junction, terminal p is not strapped to terminal pp. Associated with outgoing junctions is a guard circuit comprising high resistance slow operating relay JG and rectifier MRJ. The wire from contact 11 of the bank of wiper CN3 is also connected to the junction of contact jg1 and rectifier MRJ and relay JG is connected between rectifier MRJ and the strapped terminals p and pp of the second choice junction circuit as indicated by the dotted lines. After the last impulse of the train denoting a junction call has been received and when relay CD releases a circuit will be closed from earth over contacts ba5, h7, cd2, wiper CN7 and 11th bank contact, wiper FD7 on one of the contacts 2 to 10 connected to party lines, right hand winding of relay MB to battery. Relay MB operates and locks up over its left hand winding, contacts mb3, b5 and tha1. Contact mb2 connects earth over contacts h4, ta5 and rr1 to operate the pulse generator RR and contact mb4 extends earth over wipers CN7 and FD7 and contacts rr4 and e8 to relay H (winding (1)). Straps would be provided to enable either a dry loop or battery feed to be presented to the outgoing side of the bridge. For a dry loop strap U1 will be in position and the operation of relay MB will close the loop over contact mb5 and disconnect positive battery at contact mb7. For battery feed, straps U2 and U3 will be in position and strap U1 removed so that contacts mb5 and mb7 will be without effect. Contact mb6 prepares an operating circuit for relay TA and contact mb8 opens in the connector homing circuit. If the junction is free relay H operates from the above traced earth connection to battery connected to the cut-off relay in the junction line circuit, the connection from wiper CN3 being over contact 11, contact jg1, terminal pp, contacts pg1 and l1. Contact h2 on changing over opens the circuit over the right hand winding of relay E, closes a circuit over contacts mb1, p2, d2 and e2 for the left hand winding of the relay and at the same contact operates relay F if the parent exchange is to be rung. For this purpose contact mb1 is strapped to relay P and rectifier MRC as indicated at PE. If the parent exchange is to be called by the presentation of a dry loop strap PE will be omitted so that relay F will not be operated. If ringing current is to be applied to the junction, relay F will be operated over strap PE and rectifier MRC and after an interval relay P will be operated. In this case relay E will be held over contact p2 until relay P has operated, relay F being then held over the strap PE, rectifier MRC, contacts rt2 and f1 and ringing current is applied to the junction over wiper RS4 in position 1, the return circuit being over wiper RS5 and positive 130 v. battery. Whichever method of calling the exchange is employed ringing tone will be transmitted to the caller as previously described. Ringing, if used, is tripped and relay F released by the operation of relay RT as for a subscriber-to-subscriber call. When relay H operates contact h7 busies the junction and the earth is extended over rectifier MRJ, relay JG, terminals p and pp of the second choice junction circuit, contacts pg1 and l1 to relay K in that circuit. Relay JG operates, opens the original test circuit of the first choice junction in which relay K has operated and locked over contact k3 to the earth on the connector wiper and connects earth over contact jg2 to hold relay JG and relay K in the second choice junction circuit, which relay operated in series with relay JG, over contact k3 of the second choice junction cut-off relay. Relay JG remains thus held until the second choice junction is taken into use whereupon the earth over the test wiper of the connector used for the subsequent call short circuits relay JG to release it. These arrangements prevent a faulty first choice junction holding up all calls to the parent exchange. When the operator at the parent exchange answers the call relay D operates with the aformentioned results.

If, at the time the first choice junction is tested it is found busy, then, following the operation of relay MB relay RR will operate and at contact rr4 extend earth over wipers CN7, FD7 and contact mb4 to magnet CNM which will operate and step the connector wipers to contacts 12. If the junction connected to these contacts is free relay H will operate in series with relay K over terminals p and pp and contact k3 which will have been closed in the manner above described and the second choice junction will be taken into use. The earth extended over contact h7 and the connector test wiper will short circuit relay JG and that relay will release so that when the connection over the first choice junction is terminated the junction will test free. Operation of relay H disconnects relay RR at contact h4. If the second choice junction is found busy another pulse will be delivered to magnet CNM and the connector wipers are stepped to position 1. In this position earth over wiper CN7 is extended over contact mb6 to operate relay TA and further over rectifier MRA and contact e8 to relay H for the testing of the third choice junction. Relay TA operates and ringing tone is reverted over contacts IRT, hc1, e4 and h3 or busy tone is reverted over wire BT, contacts e3, ta4 and h3 as the case may be, relay E being held over contacts h2, mb1, p2, d2 and e2 if the junction is free and released by the opening of contact ta1 if the junction is busy.

Calls from the parent exchange are dealt with in the same way as calls from a party line subscriber. In the example illustrated junctions are connected to contacts 1, 11 and 12 in the banks of the line finders and connectors. If the parent exchange is one requiring supervision by reversal of battery, the contacts in the bank of wiper FD6 in positions corresponding to junctions will be strapped to contact d4 and following the answering of a call and the operation of relay D, contact *d4* operates relay DD which operates and reverses the connection of battery to the junction at contacts *dd1* and *dd2* for supervision in known manner. If an operator at the parent exchange dials the digit "0" the connector will be set to contacts 11 and following the release of relay CD earth will be extended over contact *cd2*, wipers CN7 and FN7, both in position 11 to relay S in an alarm checking circuit. Relay S operates and at contact *s1* closes a circuit for slow operating relay OK, at contact *s2* connects relay PL to the common to contacts *k5* of the several line circuits and at contact *s3* connects relay PF to the fuse contacts of the power supply system. Relay MB will not be operated so that no test of the first choice junction is made. If the fuse is intact and there is no line fault causing relay PG in a line circuit to be permanently operated without relay K being operated neither relay PF nor PL will operate. When relay OK operates ringing tone will be transmitted to the operator from the ringing tone wire RTA, connected to a common source of tone, contacts *ok1*, *pl1*, *pf1* contact 11 in the bank of wiper FD5, wiper FD5, contact 11 in the bank of wiper CN5, wiper CN5, contacts *ta4* and *h3* to the tertiary winding on the repeating coil. If a permanent loop condition exists relay PL will be operated to earth over contact *s2* and contacts *k5* and *pg3* in the line circuit concerned and dialling tone from a common source over wire DTA will be reverted over contacts *pl1*, *pf1*, contact 11 in the bank of wiper FD5, wiper FD5 and thence as for the ringing tone. If the main fuse is not intact and the fuse alarm contact is closed relay PF will operate over contact *s3* and the fuse alarm contact and no tone will be reverted. When the operator takes down the connection, the circuits, including relay S and any alarm relay operated will be restored to normal in the manner previously described. Relay JG will be operated from the earth extended over wiper FD3 and contacts *k4* and *k3* and the junction will be locked out from further use after release until the second choice junction has been taken into use either for an outgoing or incoming call as previously described.

When an abnormal condition prevails, such as a permanent loop on a line, failure to dial by the caller or failure to clear, the thermal relays TH and THA will be operated in the manner hereinbefore mentioned. Operation of relay TH releases relay B at contact *th1* and release of relay B releases relay K at contact *b3*. Relay K while operated held relay PG operated and when it releases relay PG is again connected to the line over contact *pg2* and is held over the loop to earth either over contact *k2* or to an earth fault. Contact *k5* being back and contact *pg3* being in its operated condition the circuit for relay PL is prepared to respond to an alarm checking connection set up from the parent exchange. Contact *pg1* opens to disconnect relay K from wire *pp* in the connector multiple to prevent a connector testing into a line in a permanent loop condition. If a low resistance earth is present on a line when the code or ringing potential is applied to it relay HC will be operated and at contact *hc2* will switch into circuit its high resistance winding to limit the current flow to the fault. Contact *hc1* on changing over will substitute busy tone for ringing tone.

Dialling and ringing tones are generated in the device DT individual to the link circuit which comprises a cold cathode tube, inductance and capacity shunted by a resistance and acting as a relaxation oscillator, the tones being induced in a second winding of a double wound retard coil, one winding of which is the inductance in the generator circuit and the other winding is connected over contact *cd1* and other contacts to the tertiary winding TW of the repeating coil. The generator is connected to the 130 volt battery.

Busy tone is generated in a similar manner in a relaxation oscillator in a common circuit the tone being fed over interrupting contacts which may be contacts of a set of interacting relays set into cyclic operation by the connection of earth over contact *ba7* and *d6*. The start circuit over contacts *ba7* and *d6* may also start cyclic action of a set of relays for interrupting the tone generated by relay RR in the characteristic manner, the relays bringing about the periodic reversal of contacts IR and IRT in the ringing current and ringing tone circuits.

What is claimed is:

1. A telephone system including a switching centre, a plurality of subscriber's stations, a party line extending between said switching centre and said plurality of subscriber's stations and comprising a pair of line wires, code selecting means at said switching centre for selecting from a plurality of party-selecting codes, for transmission over said party line, the particular party-selecting code pertaining to a wanted one of said stations, each party-selecting code consisting of a constant plurality of code elements and each code element being characterised both by the particular line wire of said pair over which it is transmitted and an electrical characteristic, code transmitting means at said switching centre for transmitting in orderly succession over said party line the code elements of a party-selecting code selected by said code selecting means, ringing current transmitting means at said switching centre for transmitting, concurrently with the transmission by said code transmitting means of the last code element of a party-selecting code over a line wire of said pair, a ringing current over the other line wire of said pair, said ringing current being quite distinct from the concurrently-transmitted code element, a series of electromagnetic switching devices at each of said stations comprising one such device for and corresponding to each code element of the party-selecting code pertaining to the station, means at each of said stations individual to and in circuit with each said electromagnetic switching device at the station for causing each said device to be unresponsive to an electrical characteristic other than the particular one employed for the corresponding code element, a connection at each of said stations for the first said electromagnetic switching device at the station closed permanently to connect the device to the party line and a connection at each of said stations for each said electromagnetic switching device at the station other than the first closed to connect the device to the party line on the response of the preceding said electromagnetic switching device at the station to a code element, said connections at each of said stations serving for causing the said electromagnetic switching devices at the station to be responsive in orderly succession to the code elements of the particular party-selecting code pertaining to the station, a bell at each of said stations, said bell being normally disconnected from the party line, and a connection at each of said stations closed, on the response of the last said electromagnetic switching device at the station to a last code element received over a line wire of said pair, to connect said bell at the station to the other line wire of said pair and thereby to cause this bell to be responsive to the ringing current transmitted by said ringing current transmitting means.

2. A telephone system including a switching centre, a plurality of subscriber's stations, a party line extending between said switching centre and said plurality of subscriber's stations and comprising a pair of line wires, code selecting means at said switching centre for selecting from a plurality of party-selecting codes, for transmission over said party line, the particular party-selecting code pertaining to a wanted one of said stations, each party-selecting code consisting of first and second code elements and each code element being characterised both by the particular line wire of said pair over which it is transmitted and the polarity of an applied voltage, code transmitting means at said switching centre for transmitting in orderly succession over said party line the two code elements of a party-selecting code selected by said code selecting means, ringing current transmitting means at said switching centre for transmitting, concurrently with the transmission by said code transmitting means of the second code element of a party-selecting code over a line wire of said pair, a ringing current over the other line wire of said pair, said ringing current being quite distinct from and differing in character from the concurrently-transmitted code element, first and second electromagnetic switching devices at each of said stations for responding to the first and second code elements respectively of the party-selecting code pertaining to the station, a rectifier at each of said stations for and in circuit with each said electromagnetic switching device at the station for causing each said device to be unresponsive to a voltage, on a line wire of said pair, of the polarity opposite to that of the voltage transmitted to this line wire to constitute the corresponding code element, a connection at each of said stations for said first electromagnetic switching device at the station closed permanently to connect the device to the party line for causing the device to be responsive to the first code element of the particular party-selecting code pertaining to the station, a connection at each of said stations for said second electromagnetic switching device at the station closed, on the response of said first electromagnetic switching device at the station to a first code element, to connect said second electromagnetic switching device at the station to the party line for causing this second electromagnetic switching device to be responsive to the second code element of the particular party-selecting code pertaining to the station, a bell at each of said stations, said bell being normally disconnected from the party line, and a connection at each of said stations closed, on the response of said second electromagnetic switching device at the station to a second code element received over a line wire of said pair, to connect said bell at the station to the other line wire of said pair and thereby to cause this bell to be responsive to the ringing current transmitted by said ringing current transmitting means.

3. A telephone system as claimed in claim 1 including at each of said stations for each said electromagnetic switching device at the station a gas discharge tube and a rectifier connected in series with each other and with the device.

4. A telephone system as claimed in claim 2 including at each of said stations for each said first electromagnetic switching device at the station a gas discharge tube connected in series both with the device and with said rectifier in circuit with the device.

5. A telephone system as claimed in claim 2 including line-wire earthing means at said switching centre for connecting, concurrently with the transmission by said code transmitting means of the first code element of a party-selecting code over a line wire of said pair, earth to the other line wire of said pair.

6. A telephone system as claimed in claim 1 in which said code selecting means comprises a code selecting uniselector set in response to a digit or digits received at said switching centre additional to those designating said party line.

7. A telephone system as claimed in claim 6 in which said code selecting uniselector is included in a link circuit, and said link circuit includes a connector having an outlet to said party line, means for setting said connector to said outlet in response to the receipt in said link circuit of the digits designating said party line, means for testing the free or busy condition of an outlet to which said connector is set, and means operative on the connector being set to said outlet to said party line to delay testing of the outlet pending the setting of said code selecting uniselector.

References Cited in the file of this patent

UNITED STATES PATENTS

| | | |
|---|---|---|
| 1,889,466 | Crowe | Nov. 29, 1932 |
| 2,186,315 | Baloun | Jan. 9, 1940 |
| 2,276,518 | Seiffert | Mar. 17, 1942 |

FOREIGN PATENTS

| | | |
|---|---|---|
| 434,446 | Great Britain | Sept. 2, 1935 |